United States Patent
Luo et al.

(10) Patent No.: US 8,830,624 B2
(45) Date of Patent: Sep. 9, 2014

(54) WRITE POLE FOR RECORDING HEAD

(75) Inventors: Yong Luo, Plymouth, MN (US); Zhe Shen, Lakeville, MN (US); Dong Lin, Eden Prairie, MN (US); Huaqing Yin, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 158 days.

(21) Appl. No.: 13/533,411

(22) Filed: Jun. 26, 2012

(65) Prior Publication Data

US 2013/0344351 A1 Dec. 26, 2013

(51) Int. Cl.
*G11B 5/187* (2006.01)
*G11B 5/31* (2006.01)

(52) U.S. Cl.
CPC ............ *G11B 5/3106* (2013.01); *G11B 5/3116* (2013.01)
USPC .................................. 360/125.01; 428/815.2

(58) Field of Classification Search
None
See application file for complete search history.

(56) References Cited

U.S. PATENT DOCUMENTS

| 7,558,020 | B2 | 7/2009 | Sasaki et al. | |
|---|---|---|---|---|
| 8,320,076 | B1 * | 11/2012 | Shen et al. | 360/125.04 |
| 8,720,044 | B1 * | 5/2014 | Tran et al. | 29/603.14 |
| 2006/0103980 | A1 | 5/2006 | Sasaki et al. | |
| 2006/0198050 | A1 | 9/2006 | Mochizuki | |
| 2006/0221497 | A1 | 10/2006 | Okada | |
| 2006/0238918 | A1 | 10/2006 | Kato | |
| 2007/0247747 | A1 * | 10/2007 | Benakli et al. | 360/125 |
| 2008/0198508 | A1 | 8/2008 | Nishikawa | |
| 2009/0268344 | A1 * | 10/2009 | Guan et al. | 360/119.02 |
| 2011/0051293 | A1 * | 3/2011 | Bai et al. | 360/313 |
| 2011/0094888 | A1 * | 4/2011 | Chen et al. | 205/81 |
| 2011/0281023 | A1 * | 11/2011 | Seets et al. | 427/58 |
| 2012/0181181 | A1 * | 7/2012 | Cheng et al. | 205/122 |
| 2012/0237878 | A1 * | 9/2012 | Zeng et al. | 430/319 |

OTHER PUBLICATIONS

European Search Report for Application No. EP 13 17 2919 dated Aug. 29, 2013.

* cited by examiner

*Primary Examiner* — Kevin Bernatz
(74) *Attorney, Agent, or Firm* — HolzerIPLaw, PC (57) ABSTRACT

A write pole structure disclosed herein includes a write pole layer, a bottom layer including a beveled surface, and a cap layer between the write pole layer and the bottom layer, wherein the cap layer is made of a material with hardness less than hardness of the write pole layer.

18 Claims, 8 Drawing Sheets

WRITE POLE FOR RECORDING HEAD

BACKGROUND

In a magnetic data storage and retrieval system, a magnetic read/write head typically includes a reader portion having a magnetoresistive (MR) sensor for retrieving magnetically encoded information stored on a magnetic disc. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information as necessary to recover the information encoded on the disc.

SUMMARY

Implementations described and claimed herein provide a write pole structure comprising a write pole layer, a bottom layer including a beveled surface, and a cap layer between the write pole layer and the bottom layer, wherein the cap layer is made of a material with hardness less than hardness of the write pole layer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

DETAILED DESCRIPTIONS

Perpendicular magnetic recording is used in the recording industry due to the improved super-para-magnetics of recording bits in their remnant state. With the further push to increase areal density, recording writers are required to generate large write fields and field gradients in the recording layer of the magnetic media. However, the write field from recording writer's main pole is generally limited by the maximum magnetic moment of the head material and the pole geometry. As the dimensions of the tracks get smaller, the write pole and the trailing edge pole width (TPWT) of the write poles also tend to get smaller.

However, as the size of the write pole and the TWPT decreases it becomes difficult to generate large write fields and field gradients. For example, finite elements modeling (FEM) of magnetic writer poles shows that thicker write pole paddles generate more write field. However, thicker write pole paddles also result in increased adjacent track interference (ATI). Such ATI resulting from thick write paddles can be reduced by increasing a write pole wall angle to some optimized degree by trading-off with other performance specifications. Here the write pole wall angle is an angle between a surface of the write pole and a vertical plane parallel to an air bearing surface and tangentially parallel to movement of the write pole along a storage medium. Furthermore, increasing the write pole wall angle results in a bridged pole, which results in mechanical instability of the write pole, often resulting in a broken pole during write pole formation processes such as write pole lift-off or write pole chemical mechanical polishing (CMP).

The process disclosed herein allows manufacturing the write pole to improve the mechanical stability of the write pole. Specifically, the process disclosed herein allows for the manufacturing of write poles with a reduced risk of broken poles while achieving a high write pole wall angle. For example, the process disclosed herein can be used to manufacture a write pole with paddle thickness above 290 nm and having high write pole wall angle. In one implementation, the write pole wall angle is greater than 13°.

Figure 1:
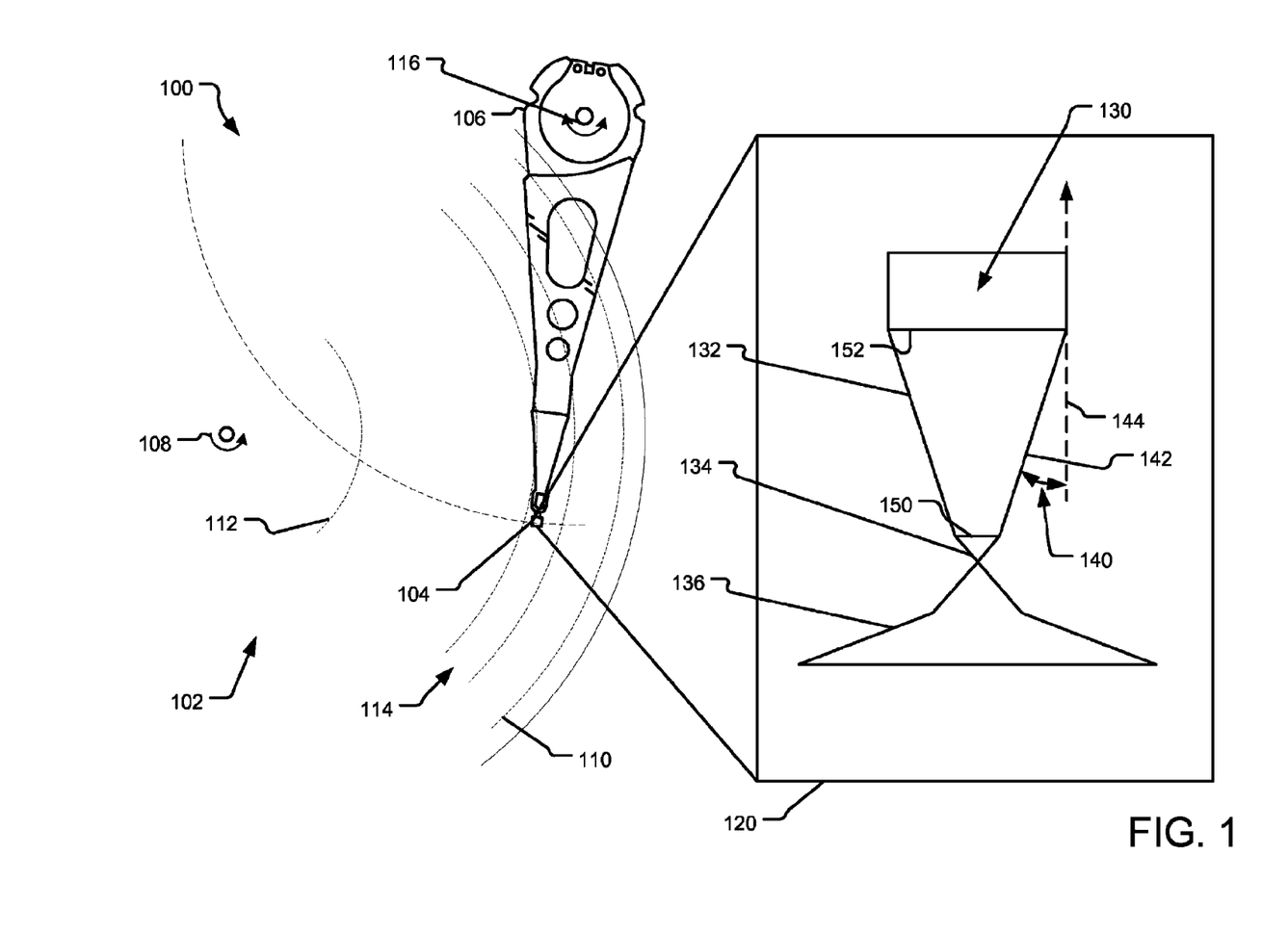
FIG. 1 illustrates a schematic block diagram illustrating an example write pole structure implemented on an end of an actuator assembly.

FIG. 1 illustrates a schematic block diagram 100 illustrating an example of a write pole structure implemented on an end of an actuator assembly. Specifically, FIG. 1 illustrates a plan view of an implementation of a disc 102 with a transducer head 104 situated on an end of an actuator assembly 106. Disc 102 rotates about a disc axis of rotation 108 during operation. Further, disc 102 includes an outer diameter 110 and inner diameter 112 between which are a number of data tracks 114, illustrated by circular dotted lines. Data tracks 114 are substantially circular and are made up of regularly spaced patterned bits.

Information may be written to and read from the patterned bits on the data tracks 114 through the use of the actuator assembly 106, which rotates during a data track 114 seek operation about an actuator axis of rotation 116 positioned adjacent the disc 102. The transducer head 104 mounted on the actuator assembly 106 at an end distal the actuator axis of rotation 116 flies in close proximity above the surface of the disc 102 during disc operation. The transducer head 104 includes a read pole for reading data from the track 114 and a write pole for writing data to the track 114.

In one implementation of the transducer head, the write pole of the transducer head 114 includes various layers. A cross-sectional view 120 illustrates such layers of a write pole of the transducer head at an air bearing surface of the disc 102. Specifically, the write pole includes a mask layer 130, a write pole layer 132, a cap layer 134, and a bottom layer 136. The cross-sectional view 120 illustrates a cross-section of the write pole facing the air-bearing surface such that the mask layer 130 trails bottom layer 136 along the track 114 as the disc rotates around the axis 108. In other words, a wider end 152 of the write pole layer 132 trails a narrower end 150 of the write pole layer 132.

In one implementation of the write pole, the mask layer 130 is made of a hard mask material such as a layer of Ta. Alternatively, the mask layer 130 is made of multiple layers, such as a harder layer made of $Ba_2O_3$ followed by a softer layer made of poly-methyl methacrylate (PMMA), etc.

In one implementation of the write pole, the write pole layer 132 is made of a ferromagnetic material such as NiFe, FeCo, NiFeCo, FeN, etc. During operation of the transducer 104, electric current in a coil positioned around the write pole layer 132 and a yoke that is part of the transducer head 104 creates a magnetic field in the write pole layer 132 that is used to affect the magnetization of an associated medium along the track 114 of the disc 102. The write pole layer 132 has a trapezoidal cross section with the narrower side 150 of the trapezoid being on the leading edge along the down-track direction compared to the wider side 152 being on the trailing edge along the down-track direction.

In one implementation of the write pole layer 132, the write pole wall angle 140 between a surface of a side wall 142 of the write pole layer 132 and an axis 144 denoting the direction of the movement of the write pole along the disc surface in the down-track direction is optimized. Specifically, the write pole wall angle 140 is optimized to trade-off electrical performance and process manufacturing. Specifically, the axis 144 lies in a plane that is perpendicular to the air bearing surface and tangentially parallel to the direction of movement of the write pole along the disc surface.

The writing efficiency of write pole depends on the softness of the write pole, with softer write pole material with high permeability and low coercivity providing higher writing efficiency. Therefore, to increase the writing efficiency of the write pole, various layers of the write pole are selected of softer material. However, a write pole having soft material results in mechanical stability issues for the write pole during operation. To achieve higher writing efficiency and higher mechanical stability, in one implementation of the write pole, the cap layer 134 is made of a material that is softer than the material of the write pole layer 132. Thus, the hardness of the material of the cap layer 134 is less than the hardness of the material of the write pole layer 132. In an alternative implementation, the cap layer 134 is made of a material that is softer than the material of the bottom layer 136. Thus, the hardness of the material of the cap layer 134 is less than the hardness of the material of the bottom layer 136. For example, the cap layer 134 is made of softer material such as copper, silver, gold, softer aluminum, ruthenium, platinum, etc. Other softer material may also be used. Using the cap layer 134 of a softer material than one of the write pole layer 134 and the bottom layer 136 allows the write pole to achieve higher writing efficiency and higher mechanical stability.

In one implementation of the write pole, the bottom layer 136 is made of aluminum. Alternatively, other harder material, such as $Ba_2O_3$, etc., may also be used. In one implementation of the write pole, the cross section of the bottom layer 136 has a wider bottom edge down-track from a narrower top edge, wherein the narrower top edge is in vicinity of the soft cap layer 134.

Figure 2:
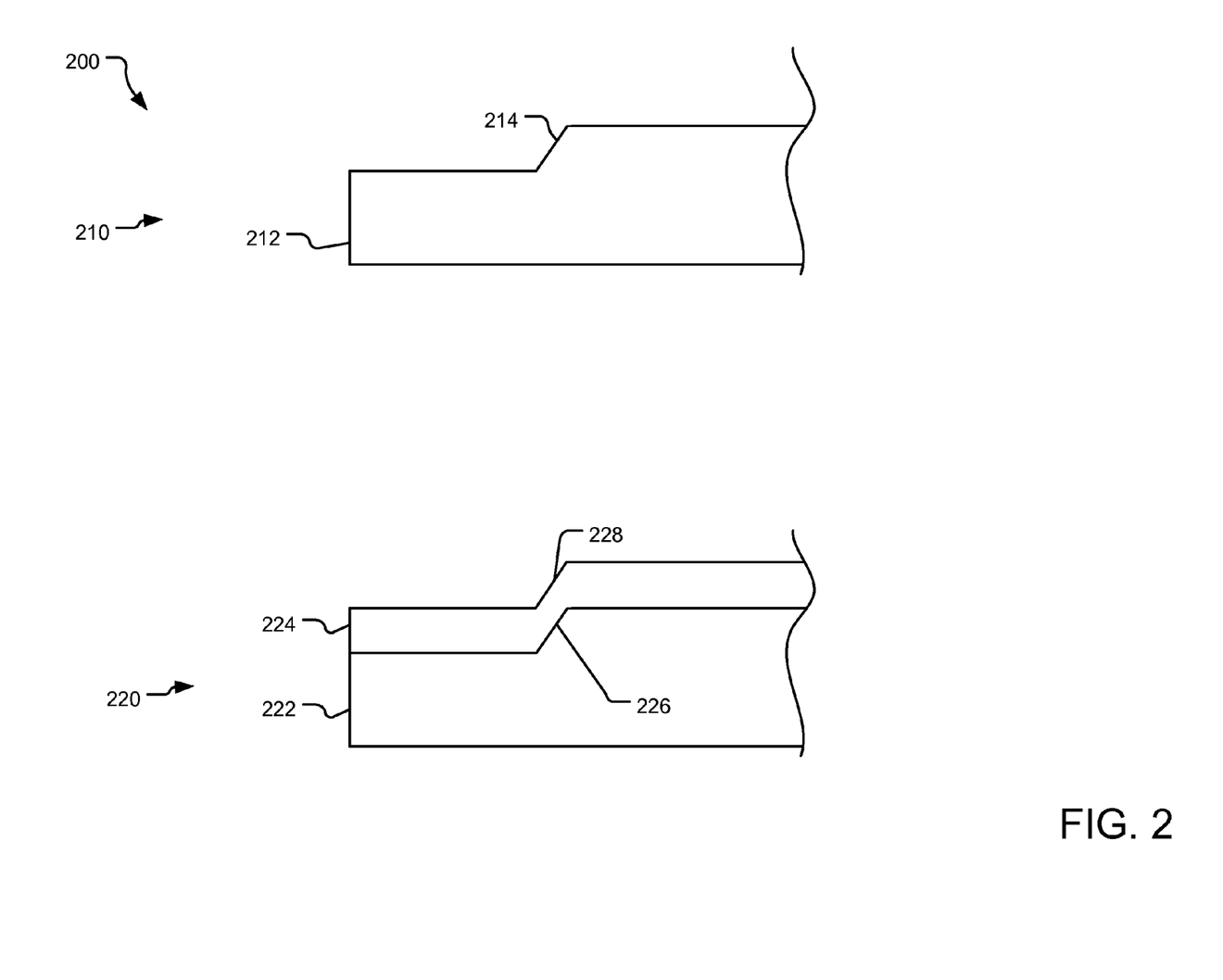
FIG. 2 illustrates block diagrams of partial write pole structures during manufacturing of the write pole structure.

FIG. 2 illustrates block diagrams of partial write pole structures 200 during manufacturing of the write pole structure. Specifically. FIG. 2 illustrates a partial write pole structure 210 including an aluminum layer 212. In one implementation, the aluminum layer 212 forms part of a substrate of a write pole. In an alternative implementation, the aluminum layer 212 is positioned on top of a substrate layer of a write pole. The aluminum layer 212 is configured to have a bumper bevel 214 such that the thickness of the aluminum layer 212 near an edge of the write pole is less than the thickness of the aluminum layer towards the center of the write pole. The bevel 214 provides a transition between the two thickness levels. While the implementation of FIG. 2 is shown to have the bevel 214 having a linear slope, in an alternative implementation, the bevel 214 is provided to have a curved slope, a step structure, etc.

FIG. 2 also illustrates another partial write pole structure 220 including an aluminum layer 222 and a soft layer 224. Specifically, the partial write pole structure 220 is made by depositing the soft layer 224 on the aluminum layer 222. In one implementation, the aluminum layer 222 includes a bevel 226 and the soft layer 224 includes a bevel 228. The bevel 228 of the soft layer may be parallel to the bevel 226 of the aluminum layer. Alternatively, the bevels 226 and 228 may be configured to have slightly different angles. The soft layer 224 is made of any material with hardness that is less than the hardness of the aluminum layer 222. For example, the soft layer 224 is made of any one of copper, silver, gold, softer aluminum, platinum, etc. In one implementation, the soft layer 224 is a cap layer. The soft layer 224 may be deposited on the aluminum layer by plating, sputtering, evaporation, etc.

Figure 3A:
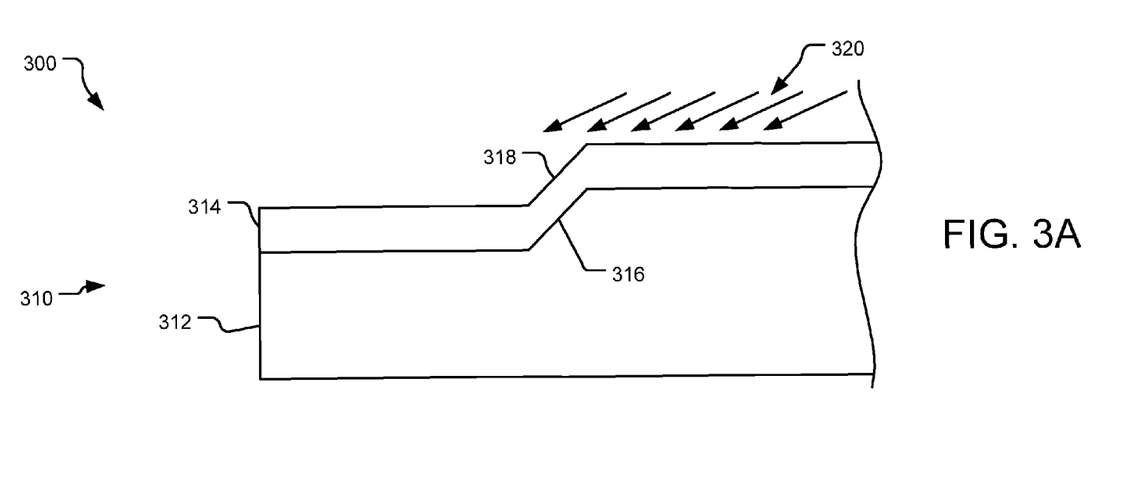
FIG. 3 illustrates block diagrams of alternative partial write pole structures during manufacturing of the write pole structure.
Figure 3B:
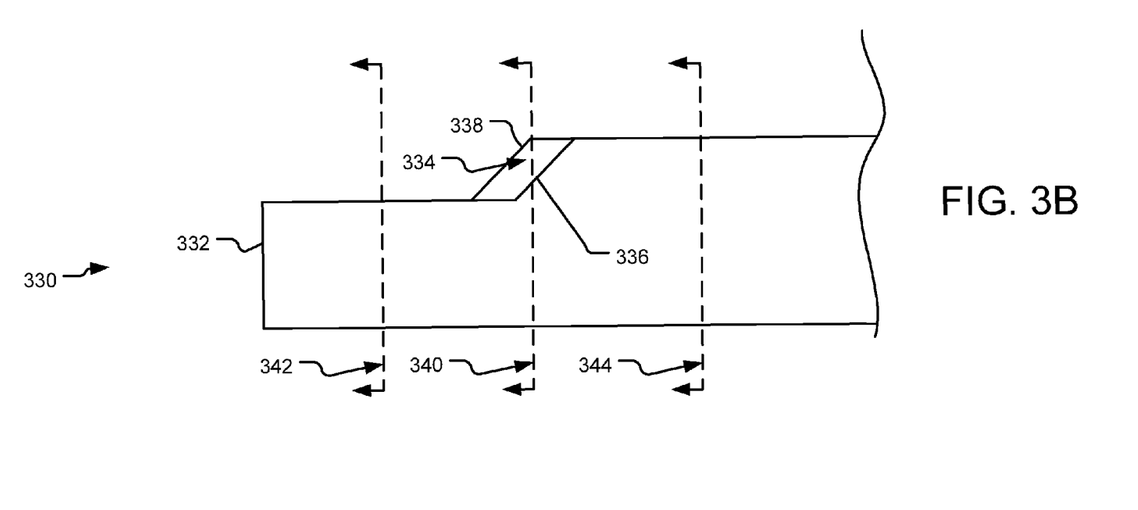

FIGS. 3A-3B illustrate block diagrams of alternative partial write pole structures 310 and 320 during manufacturing of the write pole structure. Specifically. FIG. 3A illustrates a partial write pole structure 310 including an aluminum layer 312 and a soft cap layer 314. The aluminum layer 312 includes a beveled edge 316 and the soft cap layer 314 includes a beveled edge 318. The write pole structure 310 is illustrated as undergoing a milling process. Specifically, the soft cap layer 314 is subjected to static milling. In one implementation, the static milling operation, as illustrated by numeral 320, is conducted at such an angle so that at least part of the soft layer 314 is protected from the milling operation. For example, the milling operation 320 is conducted at an angle that is lower (as compared to the horizontal surface) compared to the angle of the bevel (again, as compared to the horizontal surface). The milling operation 320 mills away most of the soft layer material, except for the material that is protected due to the angle of the beveled edge 316.

FIG. 3B illustrates another partial pole structure 330 including an aluminum layer 332 and a soft cap layer 334. Specifically, the pole structure 330 is generated as a result of the milling operation 320 on the partial write pole structure 310 of FIG. 3A. As the milling angle of the milling operation 320 is lower than the angle of the bevel 316, a portion of the soft layer 314 is preserved on the aluminum layer 312. Such preserved portion of the soft cap layer 314 is illustrated by numeral 334 in FIG. 3B. The soft layer 334 is illustrated to have an internal beveled edge 336 along the aluminum layer 332 and an external beveled edge 338. Note that while the implementation of the pole structure illustrated in FIG. 3B has the internal edge 336 and the external edge 338 substantially parallel to each other, in an alternative implementation, the external edge 338 has a lesser slope compared to the internal edge 336.

As a result of the location and shape of the soft cap layer 334 on the aluminum layer 332, the cross-sectional layout of a write pole manufactured using the write pole structure 330 depends upon the horizontal location where such cross-section is generated. For example, if a cross-section of the pole structure 330 is taken at a position illustrated by 340, such cross section will include at least some soft layer 334 as part of the cross-sectional layout. On the other hand, if the cross-section is taken at a position illustrated by 342 or 344, such cross-sectional layout will not include any soft layer 334. Furthermore, the width of the soft layer 334 in the cross-sectional layout also depends upon the horizontal location of the cross-section. Thus, the location and shape of the soft cap layer 334 provides flexibility in the manufacturing of a write pole with different configurations of the soft cap layer in the resulting write pole.

Figure 4:
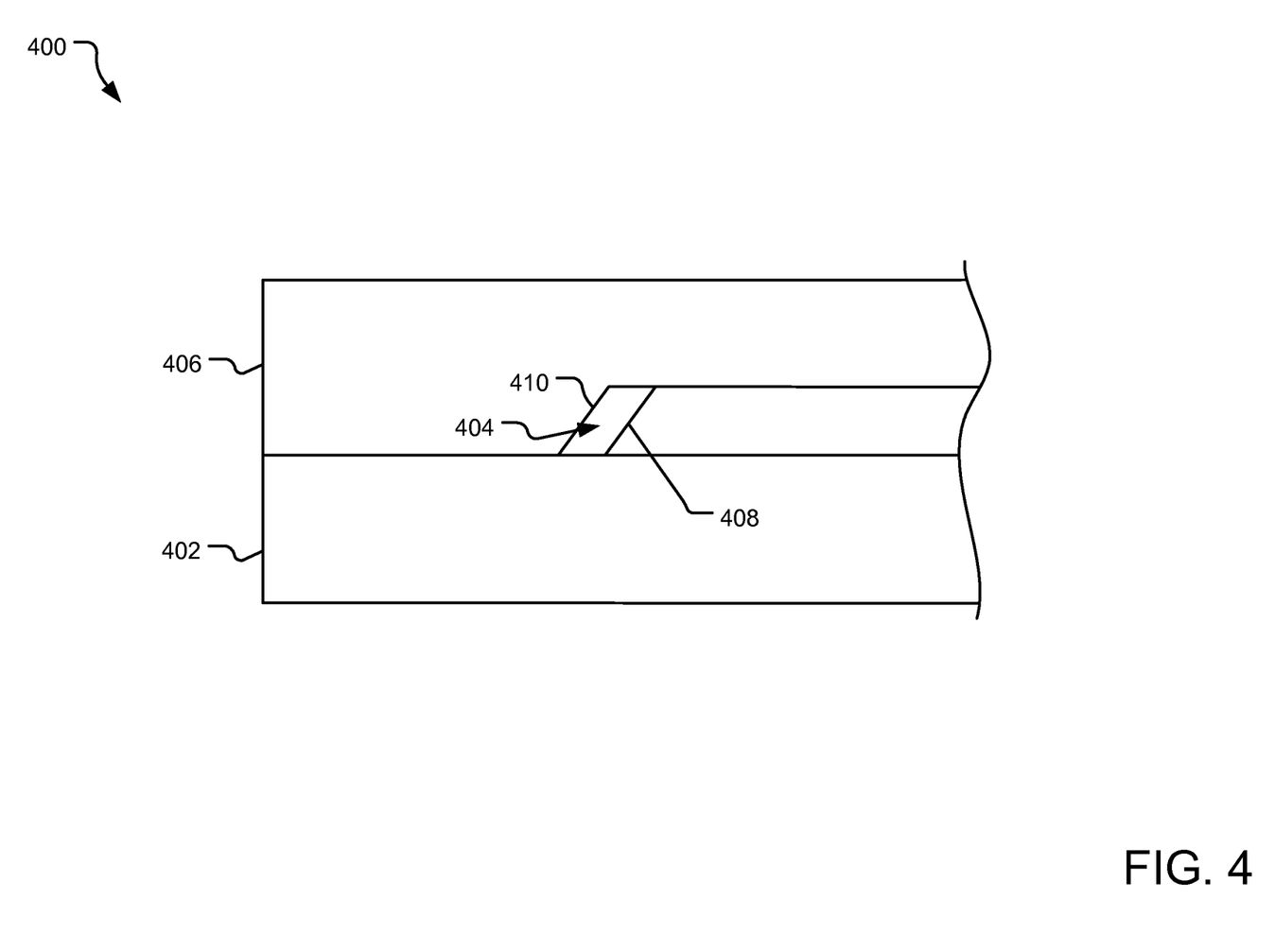
FIG. 4 illustrates block diagram of alternative partial write pole structure during manufacturing of the write pole structure.

FIG. 4 illustrates block diagram of alternative partial write pole structure 400 during manufacturing of the write pole structure. Specifically, the pole structure 400 includes an aluminum layer 402, a soft cap layer 404 and a write pole layer 406. The write pole layer 406 is deposited on the combination of the aluminum layer 402 and the soft cap layer 404 and processed using chemical-mechanical polishing (CMP). In one implementation, the write pole layer 406 is made of a ferromagnetic material such as, but not limited to, iron (Fe), cobalt (Co), nickel (Ni), and combinations thereof. For example, write pole layer 406 can comprise an alloy such as, but not limited to, iron cobalt (FeCo), iron nickel (FeNi), cobalt iron nickel (CoFeNi), and the like. In an alternative implementation, the soft cap layer 404 is made of a material with hardness less than the hardness of the write pole layer 406.

Figure 5:
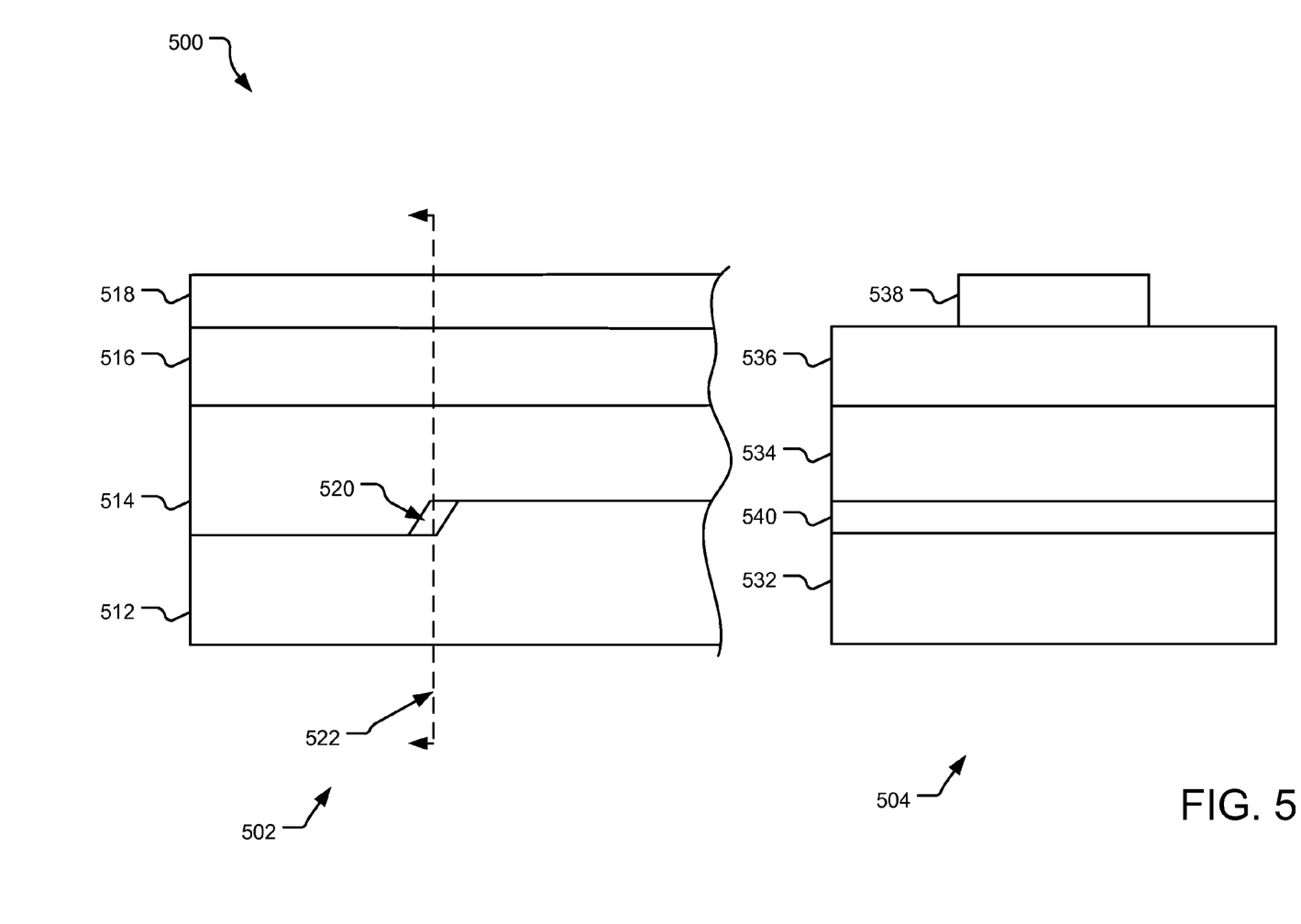
FIG. 5 illustrates an air bearing surface view and a side view of a write pole structure.

FIG. 5 illustrates an air bearing surface view and a side view of a write pole structure 500. Specifically, the side view 502 of the write pole structure includes various layers of the pole structure including an aluminum layer 512, a write pole layer 514, a hard mask layer 516, and a photo-resist layer 518. Furthermore the pole structure 502 also includes a soft cap layer 520. In one implementation, the soft cap layer 520 is made of material with hardness less than the hardness of the aluminum layer 512. In an alternative implementation, the hardness of the soft cap layer 520 is less than the hardness of the write pole layer 514.

The side view 504 of the pole structure illustrates the layers of the write pole from an air bearing surface (ABS). For example, the side view 504 illustrates a view along a cross-section 522. Specifically, the side view 504 includes an aluminum layer 532, a write pole layer 534, a hard mask layer 536, and a photo-resist layer 538. The side view 504 also includes a soft cap layer 540 positioned between the aluminum layer 532 and the write pole layer 534. The width of the soft cap layer 540 as visible in the side view 504 depends upon location of the cross-section 522 along the side view 502. Thus, for example, if the location of the cross-section 522 is away from the center of the soft-cap layer 520, the width of the soft cap layer 540 in the side view is smaller compared to the width illustrated in 504. If the cross-section 522 is away from the soft cap layer 520, to the right or left of the soft cap layer 520, then the soft cap layer 540 will not appear in the ABS view 504.

The location of the soft cap layer 520 along a bevel of the aluminum layer 512 allows the thickness of the soft cap layer 540 to be controlled using the location of the cross section 522 that defines the ABS of the write pole 504. This structure of the soft cap layer 520 along the side of the write pole 502 is described in further detail in FIG. 6.

Figure 6:
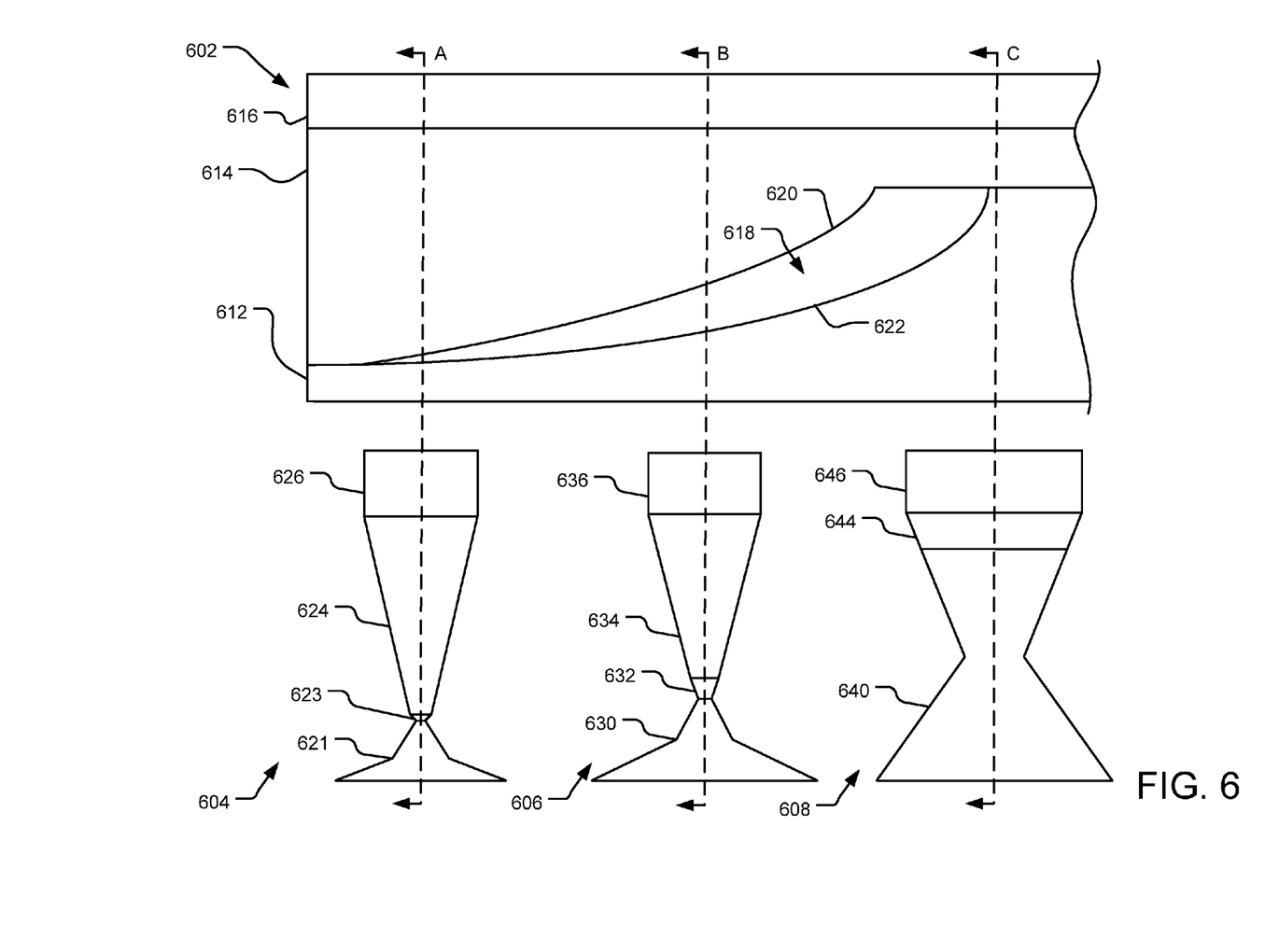
FIG. 6 illustrates a side view and various cross-sectional views of a write pole structure.

FIG. 6 illustrates a side view and various cross-sectional views of a write pole structure. Specifically, FIG. 6 illustrates a side view 602 illustrating various layers of a write pole. Furthermore, FIG. 6 also illustrates various ABS views 604, 606, and 608 of the write pole taken along various cross-section of the write pole. The side view 602 illustrates the write pole having an aluminum layer 612, a write pole layer 614, a hard mask layer 616, and a soft cap layer 618. The soft cap layer 618 is made of a material with hardness that is less than the hardness of the material of the write pole layer 614. In an alternative implementation, the hardness of the soft cap layer material is also less than the hardness of the material of the aluminum layer 612. The soft cap layer 618 is defined by a top surface 620 and a bottom surface 622. The top surface 620 may be defined by the static milling process of the soft cap layer 618. In one implementation, the soft cap layer 618 is deposited on the aluminum layer 612 and processed by static milling at an angle to the surface of the soft cap layer 618. In such a milling process the beveled lower surface 622 allows the soft cap layer 618 to be formed in a manner such that the width of the soft cap layer 618 gradually tapers. Specifically, the width of the soft cap layer 618 is larger to the right of the write pole along the side view 602 compared to the width to the left of the write pole along the side view 602.

Each of the ABS views 604, 606, and 608 illustrates an ABS view along cross sections A, B, and C respectively. As a result, the ABS view profile of the write pole is different for each of the ABS views 604, 606, and 608. Specifically, the ABS view 604 of the write pole includes an aluminum layer 621, a soft cap layer 623, a write pole layer 624, and a hard mask layer 626. The soft cap layer 623 is made of a material with hardness less than the hardness of the write pole layer 624. In an alternative implementation, the soft cap layer 623 is made of a material with hardness less than the hardness of the aluminum layer 620.

The ABS view 606 of the write pole also includes an aluminum layer 630, a soft cap layer 632, a write pole layer 634, and a hard mask layer 636. The soft cap layer 632 is made of a material with hardness less than the hardness of the write pole layer 634. In an alternative implementation, the soft cap layer 632 is made of a material with hardness less than the hardness of the aluminum layer 630. As illustrated in FIG. 6, due to the slope of the soft cap layer 618, at the cross-section B, the height of the soft cap layer 632 is higher than the height of the soft cap layer 623. While the implementation of FIG. 6 is shown to have the soft cap layer 618 having a concavely curved slope, in an alternative implementation, the soft cap layer 618 may have a linear slope, a step structure, etc. Furthermore, in an alternative implementation, the top surface 620 and the bottom surface 622 may be parallel to each other, giving a uniform width to the soft cap layer 618 throughout its slope. On the other hand, at the cross-section C, the soft-cap layer 618 is removed due to the milling process. As a result, the ABS view 608 only shows an aluminum layer 640, a write pole layer 644, and a hard mask layer 646.

Figure 7:
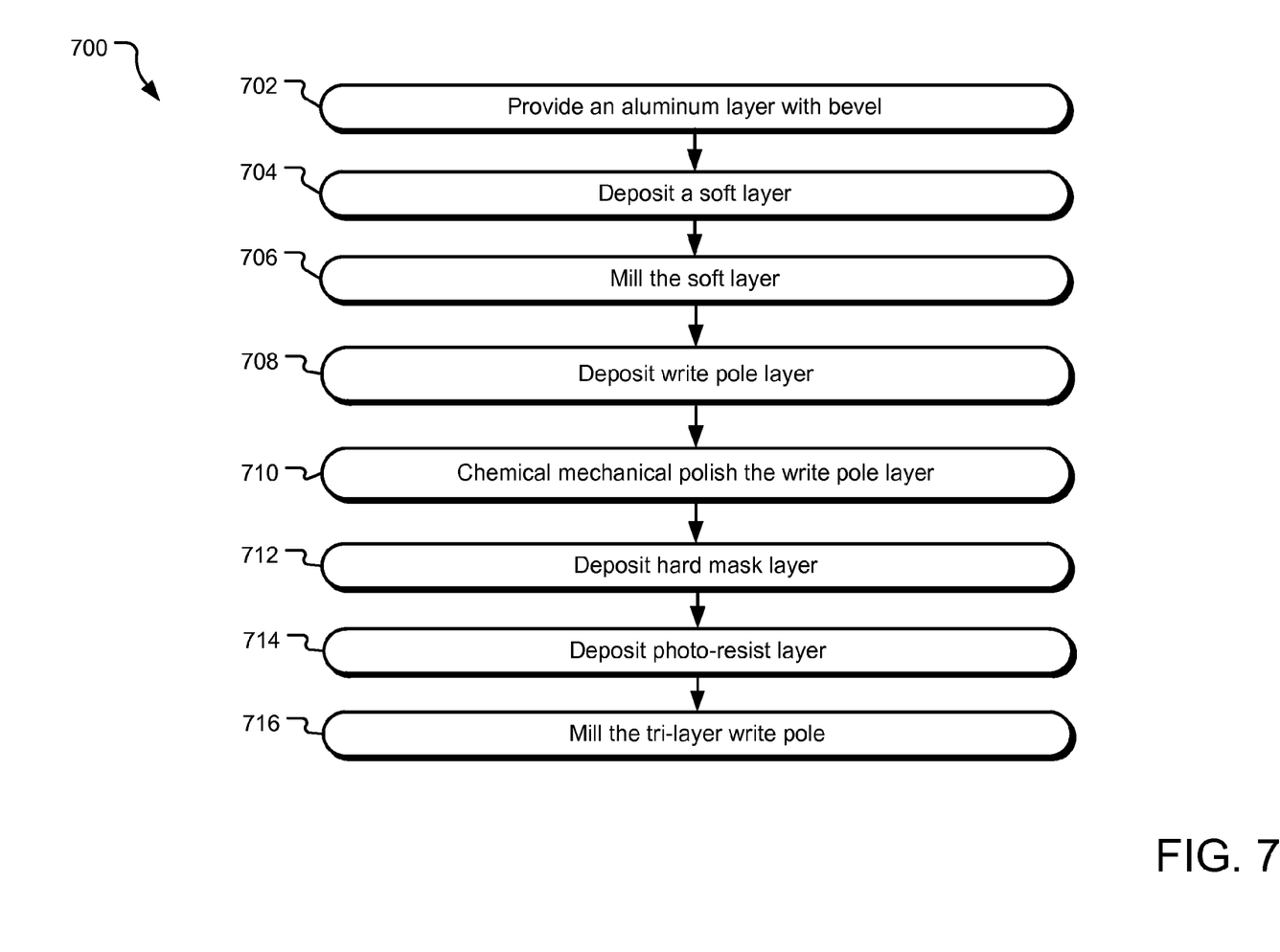
FIG. 7 illustrates example operations for manufacturing a write pole structure disclosed herein.

FIG. 7 illustrates example operations for manufacturing a write pole structure disclosed herein. Specifically, a providing operation 702 provides an aluminum layer with a bevel. Subsequently, a depositing operation 704 deposits a soft layer on the beveled aluminum layer. A milling operation 706 mills the soft layer. In one implementation, the milling operation 706 is a static milling operation that mills the soft layer at an angle such that most of the soft layer is removed except for the soft layer on the bevel of the aluminum layer. Thus, as a result of the static milling a soft layer of variable thickness is left on the bevel of the aluminum layer. Subsequently, a depositing operation 708 deposits a write pole layer. In one implementation, the hardness of the material used for write pole is higher than the hardness of the soft layer deposited on the aluminum layer bevel.

Subsequently, a polishing operation 710 polishes the write pole layer. In one implementation, chemical-mechanical polishing (CMP) process is used to polish the write pole layer. Subsequently, a depositing operation 712 deposits a hard mask layer on the write pole layer and another depositing operation 714 deposits a photo-resist layer on top of the hard mask layer. Subsequently, a milling operation 716 mills the write pole structure. The milling operation 716 may be implemented using an ion-milling process where a milling apparatus fires ions at the surface of the write pole structure from an angle, thus sputtering material away from the surface of the write pole structure. As various layers of the write pole structure may have different milling rates such that some layers mill away faster than the other layers when hit by ion beams, each of the various layers of the write pole structure may be milled at different rate of ion-milling. In one implementation, a tri-layer write pole milling process is used that includes a write pole trim milling such that a different angle of ion-milling is used for milling each of the mask layer, the write pole layer, and the cap layer. For example, in one implementation, a special high milling angle is used to achieve high write pole wall angle.

Figure 8:
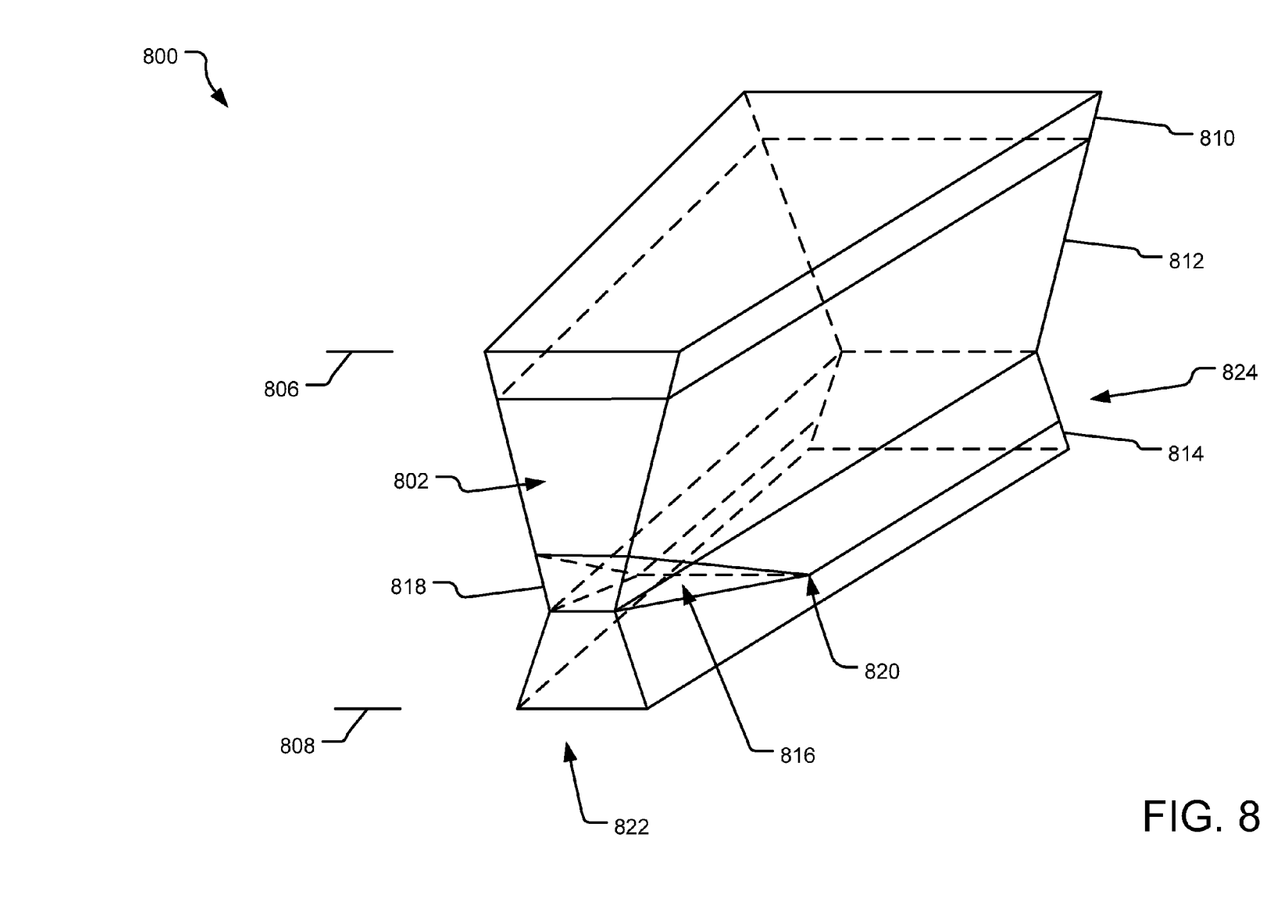
FIG. 8 illustrates an example illustration of a three-dimensional view of the write pole disclosed herein.

FIG. 8 illustrates an example illustration of a three-dimensional view of the write pole 800 disclosed herein. Specifically, the write pole 800 is shown having an air-bearing surface 802 in the front. The write pole 800 is illustrated to have a trailing edge 806 and a leading edge 808 with respect to recording media. The illustrated implementation of the write pole 800 includes a mask layer 810, a write pole layer 812, a bottom layer 814, and a cap layer 816. The cap layer 816 is illustrated to have a sloping shape with an end 818 closer to the ABS 802 having larger height than an end 820 away from the ABS 802. While the implementation of FIG. 8 is shown to have the cap layer 816 having a linear slope, in an alternative implementation, the cap layer 816 may have a curving slope, a step structure, etc. Furthermore, in an alternative implementation, a top surface and a bottom surface of the cap layer 816 may be parallel to each other, giving a uniform width to the cap layer 816 throughout its slope. The cross-sectional height of the cap layer 816 depends upon the location of the cross-section with respect to the distance from the ABS 802. The closer the cross-section is to the ABS 802, the larger is the height of the cap layer 816 at the cross-section. Moreover, while FIG. 8 shows the widths of the mask layer 810, the write pole layer 812, and the bottom layer 814 being narrower at a front end 822 compared to a far end 824, in an alternative implementation, such widths may be similar at both ends or it may vary non-linearly between the front end 822 and the far end 824.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A recording head comprising: a bottom layer extending from a front end of the head at an air bearing surface to a far end, the bottom layer with a beveled surface, the bottom layer having a front end thickness and a far end thickness different than the front end thickness;
   a cap layer, made of a material with a hardness less than a hardness of a write pole layer, on and in contact with the beveled surface of the bottom layer, the cap layer extending from the front end towards, but not to, the far end; and
   the write pole layer deposited on the cap layer, the write pole layer extending from the front end to the far end.

2. The recording head of claim 1 wherein the thickness of the bottom layer linearly increases between a first thickness and a second thickness along the beveled surface.

3. The recording head of claim 1 wherein the cap layer has a declining thickness profile.

4. The recording head of claim 1 wherein the bottom layer comprises aluminum.

5. The recording head of claim 1 further comprising a mask layer on the write pole layer.

6. The recording head of claim 1 wherein the cap layer comprises at least one of copper, silver, gold, aluminum, ruthenium, and platinum.

7. The recording head of claim 1 wherein in a cross-section of the head parallel to the air bearing surface of the head, the write pole layer has a trapezoidal shape.

8. The recording head of claim 7 wherein the trapezoidal shape has a narrower side close to the cap layer.

9. The recording head of claim 8 wherein an angle between a vertical plane that is perpendicular to the air bearing surface and tangentially parallel to movement of the head along a disc and a surface of the write pole is greater than 13°.

10. A recording head with an air bearing surface comprising:
    a write pole layer;
    a bottom layer including a beveled surface; and
    a cap layer between the write pole layer and the bottom layer and on the beveled surface, the cap layer having a width at the air bearing surface that is wider closer to the write pole than at the bottom layer, wherein the cap layer is made of a material with hardness less than hardness of the write pole layer.

11. The recording head of claim 10 wherein the cap layer comprises at least one of copper, silver, gold, aluminum, ruthenium, and platinum.

12. The recording head of claim 10 wherein a cross-section of the cap layer parallel to the air bearing surface of the write pole has varying thickness along the down-track direction.

13. The recording head of claim 10 wherein a write pole wall angle is greater than 13°.

14. A write pole having an air bearing surface and comprising a bottom layer, a pole layer, and a soft layer between the bottom layer and the pole layer, the soft layer having a height between the pole layer and the bottom layer that is less at a cross-section taken parallel to the air bearing surface than at the air bearing surface, the write pole prepared by a process comprising:
    creating a beveled surface on one of a bottom layer;
    depositing a soft layer on the beveled surface of the bottom layer; and
    milling the soft layer at an angle lower than the angle of the beveled surface.

15. The write pole of claim 14, wherein the process further comprising depositing a write pole layer on top of the milled soft layer.

16. The write pole of claim 15 wherein the hardness of the soft layer is less than the hardness of the write pole layer.

17. The write pole of claim 15 wherein the hardness of the soft layer is less than the hardness of the bottom layer.

18. The write pole of claim 15, the process further comprising cutting the write pole along the air bearing surface such that a cross-section of the write pole at the air bearing surface includes the soft layer adjacent to the write pole layer.

* * * * *